United States Patent
Tanner et al.

(10) Patent No.: US 6,750,023 B2
(45) Date of Patent: Jun. 15, 2004

(54) POROUS INORGANIC SUBSTRATE FOR HIGH-DENSITY ARRAYS

(75) Inventors: Cameron W. Tanner, Horseheads, NY (US); Patrick D. Tepesch, Corning, NY (US); Raja R. Wusirika, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 106 days.

(21) Appl. No.: 10/101,135

(22) Filed: Mar. 18, 2002

(65) Prior Publication Data

US 2003/0003474 A1 Jan. 2, 2003

Related U.S. Application Data

(63) Continuation-in-part of application No. 09/650,885, filed on Aug. 30, 2000, now abandoned.
(60) Provisional application No. 60/152,186, filed on Sep. 2, 1999.

(51) Int. Cl.[7] .......................... C12Q 1/68; C12M 1/00; C12N 11/16; G01N 15/06
(52) U.S. Cl. .................. 435/6; 435/174; 435/283.1; 435/287.2; 435/7.1; 422/68.1
(58) Field of Search ............................ 435/6, 7.1, 174, 435/283.1, 287.2; 422/68.1

(56) References Cited

U.S. PATENT DOCUMENTS

| | | | |
|---|---|---|---|
| 4,544,395 A | 10/1985 | Evans | 65/60.3 |
| 5,585,136 A | * 12/1996 | Barrow et al. | 427/2.24 |
| 5,770,722 A | 6/1998 | Lockhart et al. | 536/25.3 |
| 5,807,522 A | 9/1998 | Brown et al. | 422/50 |
| 5,843,789 A | 12/1998 | Nomura et al. | 436/164 |
| 5,959,098 A | 9/1999 | Goldberg et al. | 536/25.3 |
| 6,004,752 A | 12/1999 | Loewy et al. | 435/6 |
| 6,103,080 A | * 8/2000 | Pham et al. | 204/424 |
| 6,306,348 B1 | * 10/2001 | Havens et al. | 422/68.1 |

FOREIGN PATENT DOCUMENTS

WO  WO 00/61282  * 10/2000

OTHER PUBLICATIONS

M. Glazer et al., "High Surface Area Substrates for DNA Arrays", Mat. Res. Soc. Symp. Proc. vol. 576, 1999 Materials Research Society, pp. 371–375.

Thomas H. Elmer, "Porous and Reconstructed Glasses", Engineered Materials Handbook, vol. 4, The Materials Information Society, pp. 427–432, no date provided.

M. Glazer et al., "Colloidal Silica Films for High–Capacity DNA Probe Arrays", Chem. Mater. 2001, vol. 13, pp. 4773–4782.

* cited by examiner

*Primary Examiner*—B J Forman
(74) *Attorney, Agent, or Firm*—Vincent T. Kung

(57) ABSTRACT

A porous inorganic substrate and method of fabricating such substrate for attaching an array of biological or chemical molecules to be used in a high-density microarray device. The substantially planar substrate comprises a porous inorganic layer adhered to a flat, rigid, non-porous, inorganic understructure having a coefficient of thermal expansion compatible with that of the porous inorganic layer. The porous inorganic layer is characterized as having dispersed throughout it a plurality of interconnecting voids as defined by a network of contiguous inorganic material, each of a predetermined mean size. The continuous inorganic material and contents of the voids exhibit a high contrast in their indices of refraction relative to each other. The substrate further comprises a uniform coating of a binding agent over at least a part of the surface area of the voids and the top surface of the porous inorganic layer.

22 Claims, 13 Drawing Sheets

(a)

(b)

(a)

(b)

(a)

(b)

(a)  (b)

POROUS INORGANIC SUBSTRATE FOR HIGH-DENSITY ARRAYS

CLAIM OF PRIORTY

This Application claims benefit of priority as a continuation-in-part to U.S. patent application Ser. No. 09/650,885, filed on Aug. 30, 2000, now abandoned and U.S. Provisional Patent Application No. 60/152,186, filed on Sep. 2, 1999. The contents of both of the aforementioned applications are incorporated herein by reference.

TECHNICAL FIELD OF THE INVENTION

The present invention pertains to substrates for performing multiple assays of biological or chemical analytes. More particularly, the invention relates to a porous inorganic substrate for attaching an array of biological or chemical molecules and a method of fabricating such substrates.

BACKGROUND

Clinical and research laboratories are increasingly using DNA testing as a means to determine genetic risk factors for diseases like breast cancer, heart disease, Alzheimer's disease, etc. Simultaneous screening for many risk factors is possible by printing many "microdots" of DNA onto the same substrate, typically either a porous, organic membrane or a flat, non-porous glass slide to form a high-density array. High-density arrays have become useful tools for drug researchers and geneticists to obtain information on the expression of genes. A high-density array typically comprises between 2,000 and 50,000 probes in the form of single stranded DNA, each of a known and different sequence, arranged in a predetermined pattern on a substrate.

The arrays are used to test whether single stranded target DNA sequences interact or hybridize with any of the single stranded probes on the array. The testing procedure consists of printing and binding single-stranded DNA molecules onto a substrate. The substrate may be any size, but typically takes the form of a standard 1 inch×3 inch microscope slide. The printed DNA sequence is for a known genetic risk factor and may be tagged with a fluorescent marker for identification. Unknown DNA, such as obtained from a patient, is tagged with a different fluorescent marker and washed over the slide for a specified period of time and then rinsed. If the unknown DNA contains any strands that have complementary nucleic acid sequences to the known strand, hybridization occurs. Any hybridization on the rinsed slide is detected as fluorescence from the marker on the unknown DNA. Fluorescence above a predetermined, threshold intensity indicates that the unknown DNA contains the genetic risk factor associated with the known DNA printed on the slide.

After exposing the array to target sequences under selected test conditions, scanning devices can examine each location on the array and determine the quantity of targets that are bond to complementary probes. The ratio of fluorescent intensity relative to a reference at each spot on the high-density array provides the relative differential expression for a particular gene. DNA arrays can be used to study the regulatory activity of genes, wherein certain genes are turned on or "up-regulated" and other genes are turned off or "down-regulated." So, for example, a researcher can compare a normal colon cell with a malignant colon cell and thereby determine which genes are being expressed or not expressed in the aberrant cell. The regulatory cites of genes serves as key targets for drug therapy.

Proper performance of a DNA array depends on two basic factors: 1) retention of the immobilized probe nucleic sequences on the substrate, and 2) hybridization of the target sequence to the immobilized probe sequence, as measured by fluorescence emission from the tagged target sequence. The DNA probe material must be retained on the surface of the substrate through a series of washing, blocking, hybridizing, and rinsing operations that are commonplace in DNA hybridization assays. An excessive loss of probe DNA sequences can lead to a low fluorescent-signal-to noise ratio and uncertain or erroneous results.

DNA arrays have for years been printed onto organic, micro-porous membranes such as nylon or nitrocellulose. The densities at which one can print DNA solutions onto these types of organic micro-porous membranes is limited because of the tendency for the DNA solution to wick laterally through the membrane, thus causing cross-talk and contamination between adjacent locations. Others have employed a flat, non-porous substrate surface made from glass. (See for example, U.S. Pat. No. 5,744,305, incorporated herein by reference.) These substrates, however, have also been found wanting, since they do not retain the probe molecules as well as porous substrates.

The present invention proposes to use a substantially flat, porous, inorganic substrate surface to enhance retention of nucleic moieties for high-density arrays. The porous surface provides increased surface area for immobilizing DNA probe molecules, which increases the density of DNA binding sites per unit cross-sectional area of the substrate. The increased number of possible binding sites per unit area results in greater retention of immobilized DNA probes and the emission of an increased signal when hybridized with target molecules. A porous inorganic surface that is properly treated with a coating of a binding agent, such as a cationic polymer, can also prevent lateral cross-talk. Moreover, the present invention can both enhance sensitivity and improve threshold detection of fluorescence markers.

SUMMARY OF THE INVENTION

The present invention relates to a device for performing multiple biological or chemical assays. The device includes a substantially planar substrate for attaching a high-density array of biological or chemical analytes. The substrate comprises a porous, predominantly inorganic layer adhered to a flat, rigid, non-porous, inorganic understructure, preferably having a coefficient of thermal expansion (CTE) compatible with that of the porous inorganic layer (CTE±15–25%). Preferably the CTEs are matched. The porous inorganic layer is characterized as having a plurality of interconnected voids of a predetermined mean size of not less than about 0.1 $\mu$m dispersed therethrough, and having void channels that extend through to a top surface of the porous inorganic layer. The voids are defined by a network of either contiguous or continuous inorganic material having a predetermined mean size of not less than about 0.1 $\mu$m, and the inorganic material and contents of the voids exhibit a high contrast in their indices of refraction relative to each other.

The substrate further comprises a uniform coating of a binding agent over at least a part of the surface area of the voids and the top surface of the porous inorganic layer, and preferably an interlayer disposed between the porous inorganic layer and the inorganic understructure. The interlayer having a coefficient-of-thermal-expansion compatible with said porous inorganic layer and said inorganic understructure.

The inorganic material is characterized as a material that is non-absorbing and transparent to light when in the form of a solid of an amorphous or single crystal material, such as a glass or a metal oxide. More particularly for example, the material is, a silicate, aluminosilicate, boroaluminosilicate, or borosilicate glass, or $TiO_2$, $SiO_2$, $Al_2O_3$, $Cr_2O_3$, CU/O, ZnO, or $ZrO_2$ layer.

The porous inorganic layer of the substrate has a thickness of at least about 5 $\mu$m. The network of inorganic material is formed by adhesion or sintering of the inorganic material particles to each other. The particles have a predetermined mean size preferably in the range of about 0.5 $\mu$m to about 5 $\mu$m, more preferably in the range of about 0.5 $\mu$m to about 3.5 $\mu$m. The voids within the porous inorganic layer have a predetermined mean size preferably in the range of about 0.5 $\mu$m to about 5 $\mu$m, and also, more preferably in the range of about 0.5 $\mu$m to about 3.5 $\mu$m. And, the content of the voids consists of either a gas, a liquid, or a solid.

The invention also relates to a method of making the substrate used in the device. The method comprises the following steps: providing a flat, rigid, non-porous, inorganic understructure, applying a porous inorganic layer having a coefficient of thermal expansion compatible with that of the inorganic understructure to a top surface of the inorganic understructure. The porous inorganic layer is formed by a process that comprises: applying a layer of individual particles of an inorganic material to a top surface of the inorganic understructure, the particles having a predetermined mean size of not less than about 0.1 $\mu$m, and forming a network of either contiguous or continuous inorganic material from the individual particles to create a plurality of interconnected voids of a predetermined mean size of not less than about 0.1 $\mu$m dispersed through-out the porous inorganic layer, and having void channels that extend through to a top surface of the porous inorganic layer. Then, the inorganic material and contents of the voids are configured to exhibit a high contrast in their indices of refraction relative to each other; and the top surface and internal surfaces of the porous inorganic layer is prepared for binding biological or chemical analytes. To prevent emission of a high background signal due to non-specific binding of target DNA molecules after hybridization, the substrate can be pretreated with blocker agents or deactivators after the probe DNA has been applied.

The method may further comprise applying an interlayer disposed between the inorganic understructure and the porous inorganic layer. The interlayer has a coefficient-of-thermal-expansion compatible said inorganic understructure and with said porous inorganic layer. A tape casting or a screen printing process may be used in the forming of the network of continuous inorganic material from the individual particles.

Other features and advantages of the present invention are disclosed in the detailed description below.

BRIEF DESCRIPTION OF FIGURES

FIG. 8(a) is on a log—log scale, and to emphasize sensitivity.

DETAILED DESCRIPTION OF THE INVENTION

Figure 1:
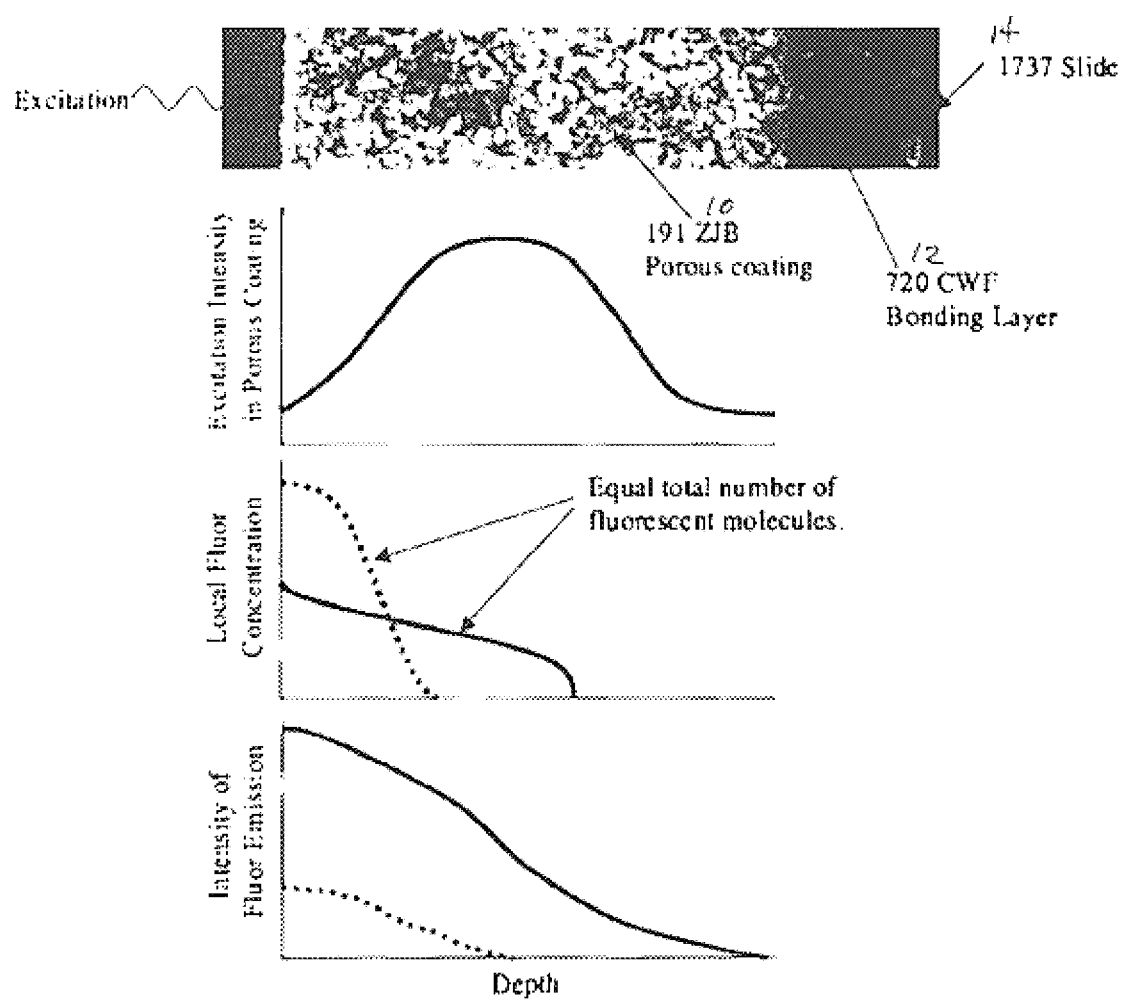
FIG. 1 illustrates the interaction between excitation with two different distributions of fluorescent molecules within a porous microarray substrate and the postulated effect on apparent emission. At the top is a cross-sectional SEM photograph of a porous microarray according to the present invention. The accompanying graphs represent excitation intensity in the porous layer, local fluorophore concentration, and fluorescent emission intensity, as a function of depth in the porous layer.

High-density arrays (HDAs), or otherwise known as microarrays, allow for rapid, parallel testing of differential expression in a large numbers of genes. Currently available HDAs consist of a substrate, a surface coating or chemical treatment (e.g., amination) of the substrate, and thousands of purposefully placed spots each containing strands of DNA of a known sequence. The current substrates are typically flat, non-porous glass. Even with modifications to glass composition and surface chemistry, a non-porous surface does not offer many opportunities to affect detection threshold or sensitivity. The present invention presents several advantageous aspects.

According to the present invention, a porous substrate or coating comprised predominantly of a porous inorganic component applied to a dense backing is superior to a flat, non-porous glass slide for use as microarray substrates in detecting tagged fluorescent molecules, both before and after hybridization. Porous ceramic or glass substrates for DNA-binding can consistently yield improved performance relative to both other porous and non-porous flat substrates, and can satisfy other requirements such as chemical and mechanical durability. According to a preferred method, the porous surfaces are fabricated by means of a tape-casting or a screen-printing process using respectively a ceramic or glass containing slip or paste/ink. Adjustments in firing temperature, firing time, and size of the ceramic or glass particles can control the size of the microstructures. Tape-cast porous borosilicate glass (Corning Inc., Code 7761) layers on calcium aluminosilicate glass slides (Corning Inc., Code 1737) tend to retain the greatest absolute quantity of DNA after printing and through all washing, blocking, hybridizing, and rinsing steps. Printed DNA bound on porous tape-cast borosilicate are accessible for hybridization, and exhibit higher absolute signals and signal-to-noise ratio than achieved for porous glass slides or sol-gel coated slides.

The performance of an HDA depends on several factors, such as composition and purity of the substrate, surface chemistry applied to the substrate, and quality of biological molecules applied at all stages of manufacture and use. Generally, from a device viewpoint, a microarray is a sensor, and its response can be benchmarked using standard criteria. Three reference points of merit for any sensor are detection threshold, sensitivity, and dynamic range. The detection threshold is the level at which the smallest input to the sensor can be detected in the output response. The sensitivity relates the input signal to the output signal of the sensor in the dynamic range. The dynamic range, in combination with the detection threshold, defines an upper limit for the response of the device. Inputs greater than some threshold value do not change the sensor output.

The performance of different types of microrrays can be compared using these criteria. A superior microarray is one with the lowest detection threshold, highest sensitivity, and widest dynamic range. The benefits of lower detection threshold are immediately apparent. Differential expression can be measured for genes expressed at lower concentrations of biological molecules. The accuracy of measurement in testing for differential expression is affected by sensitivity. Higher sensitivity provides greater accuracy, especially at concentrations near the detection threshold. With the higher sensitivity, uncertainty or error in intensity due to factors associated with excitation laser and photomultiplier detector in the scanner can be reduced. Thus, discrimination between smaller concentrations can be made with greater accuracy in differential gene expression. A wider dynamic range is also an attractive feature, which is achievable if provided with properly calibrated and adjusted scanning equipment that is compatible and capable of accommodating high-sensitivity microarrays.

According to the present invention, porous, inorganic substrates can provide significant advantages over prior inorganic and organic substrates for high-density DNA arrays. Porous inorganic substrates for arrays have superior sensitivity and lower detection threshold when compared to flat, nonporous surfaces. Porous inorganic substrates having certain types of microstructure can produce fluorescent-molecule sensitivities of one or more than two orders of magnitude greater than that of a flat, non-porous slide. Sensitivity is an important property for biological applications where detection of fluorescent molecules is required. A substrate with higher sensitivity is attractive for these applications since smaller changes in concentration and possibly lower overall concentrations can be more easily detected. Enhanced sensitivity and lower detection thresholds provide opportunities to reduce cost for the array manufacturer or user. Less material could be printed during manufacture, or the concentration of probes in hybridization solution could be reduced while still maintaining the same level of performance, if not a higher level than that of a flat slide.

Although not intending to be bound by theory, it is believed that enhanced sensitivity in porous inorganic substrates is based upon light scattering. Light scattering due to the difference in refractive index between the pore and the solid material is greatest when the pore size is similar to the wavelength of the fluorescent markers. Typical chemical markers used in biological assays fluoresce in the visible range, 300–800 nm, which includes the size of pores inherent to the tape cast porous layers. It is believed that light scattering generated by the random index variations in the porous layer creates local higher excitation intensity. Unlike in an ordinary flat, nonporous glass slide, where photon excitation has but only one opportunity to interact with a fluorophore molecule, in a porous-coated substrate excitation is scattered multiple times before exiting the porous layer. This light scattering effect may in part be due to the microstructure features of the porous layer such as layer thickness, particle size, particle shape, pore size, pore shape, porosity, continuity of the glass and pore phases, surface density of binding sites, etc. Adjustments of these parameters may optimize the light scattering effect. Thus, a higher rate of light emission from the fluorescent molecules is possible in the porous layer provided that the two-level fluorescent system is not itself saturated. The light scattering effect and enhanced sensitivity disappear on infiltration of the pores of the coating with an index matching fluid such as glycerol.

It is believed that the superior sensor characteristics of a porous slide of the present invention are due to a higher surface area for binding of biological molecules, improved excitation of fluorophore due to scattering of excitation through the porous surface, and rapid hybridization kinetics. The porous surface can have greater density of binding sites per unit area for DNA attachment than a comparable flat nonporous substrate. Hence, a greater absolute number of printed DNA molecules can be retained through all steps of a DNA analysis process. An increase in the absolute number of retained DNA is important, since it minimizes the loss of DNA during the processing steps. Also, since it is proportionate to the absolute number of DNA molecules, the optical signal from the fluorescent tags on both the printed, known DNA strands and any hybridized, unknown strands is strengthened.

Additionally, it is believed that the effective number of binding sites on the substrate increases with decreasing particle size and increasing thickness of the porous layer. Retention of DNA can be enhanced by the microstructural characteristics of a porous, nucleic-acid-binding surface. As stated before, retention of printed DNA through washing, blocking, hybridizing, and rinsing operations is critical. Excessive loss of the printed DNA leads to a low fluorescent signal-to-noise-ratio and lack of confidence in the analysis. A porous surface effectively increases the number and density of possible DNA binding sites per unit area of the cross-section. Moreover, one should keep in mind that the type of surface chemistry, ink composition, print pins size, and ink volume may effect sensitivity, though not light scattering.

To achieve enhanced sensitivity, two other parameters preferably should be satisfied. First, the distribution of the fluorescent molecules on the internal surfaces of the porous glass structure should overlap localized higher excitation intensity. Second, light emitted by the fluorescent molecules should be able to escape the porous structure to be observed and measured. The distribution of fluorescent molecules as a function of depth in the porous coating may have a dramatic effect on sensitivity. One can alter this distribution by modifying the density of binding sites or the number of molecules to be bound that are present in the ink. No matter what the concentration of biological material in printing inks one can achieve heightened sensitivity in the inventive porous substrates relative to conventional substrates.

FIG. 1 shows a scanning electron microscope (SEM) micrograph of a porous inorganic substrate in cross section and indicates that excitation for the fluorophores enters from the left. The substrate has a porous layer 10, a bonding layer 12, and a non-porous bottom or understructure 14. FIG. 1 depicts light scattering excitation within the porous layer, which provides a higher local intensity. Assuming that the microstructure reflects or guides the fluorescent emission to the surface of the porous coating, the figure illustrates the effect of two different distributions of the same total number of fluorophores. For the dotted curve, the fluorescent molecules are located near the top surface of the porous coating, while for the solid curve, the fluorophores are more uniformly distributed throughout the coating. Apparent fluorescent emission intensity is higher for the distribution shown by the solid curve versus the dotted curve because there is more overlap of the fluorophores with the enhanced excitation.

Another virtue of the present porous surface slides is that they adsorb biological ink more efficiently than a comparable nonporous, flat, γ-aminopropylsilane (GAPS)-coated glass slide. The amount of DNA-printing inks transferred from the tips of stainless steel pins in an HDA arrayer to a porous surface is significantly higher than that to a nonporous surface. Thus, more of the biological ink is print-transferred to the porous surface than to a nonporous slide. Empirical data show that on average about 62.0% (σ=23%) of the amount ink is transferred from a printing head to the non-porous substrate, as compared to about 86–99% transfer rate for the present porous substrates. This signifies about a 38% improvement over nonporous, flat slides. In some of the better printing trials, virtually no ink remained on the tips of printing pins. This phenomenon means sizeable savings in the concentration of biological material needed in the printing of DNA high-density arrays and associated cost savings. Moreover, with the inventive substrate, ink transfer is less sensitive or likely to be subject to environmental conditions and surface properties, thus assuring more consistent printed arrays.

A porous inorganic (glass) surface has advantages over porous organic (polymer) surfaces. First, for purpose of cleaning the surface, a glass substrate is more durable. It can withstand higher temperatures, such as in an autoclave or even pyrolysis, without denaturing or deforming. Second, in contrast to polymer materials, glass does not exhibit autofluorescence. This implies that glass is also generally an inert material in comparison to polymers. Moreover, the use of glass broadens the set of applicable species of printing inks and kind of applicable attachment chemistry. For instance, ethylene glycol can't be used with nitrocellulose substrates.

The present invention in one aspect relates to a substantially planar substrate used for attaching biological or chemical molecules and a device comprising such a substrate. FIGS. 2a, 2b, 3a, 3b, and 4a, 4b, show cross sectional SEM micrographs of several embodiments of the present substrate made according to a tape-casting process. Each substrate illustrated includes a porous inorganic layer (20, 30, 40) adhered to a flat, rigid, impermeable, non-porous, inorganic understructure or backing (24, 34, 44). The understructure preferably has a coefficient of thermal expansion that is compatible with that of the porous inorganic layer, so that thermal expansion by the materials of the porous and non-porous parts do not warp or distort the planar flatness of the substrate, and minimizes stress in the substrate. A network formed from particles of inorganic material (e.g., glass) 16 constitutes the solid body of the porous inorganic layer. The individual particles can be either contiguous with one another (e.g., suspended in a medium), or sintered together as a continuous solid material. As defined by this network of inorganic material, many interconnected voids and channels run throughout the porous inorganic layer. Some channels extend through to the top surface of the porous inorganic layer. The size or diameter of the interconnected voids in the porous inorganic layer is in the range of about 0.1 to about 15 or 20 microns, inclusive. Preferably the voids have a size from about 0.2 to 5.0 microns (e.g., 0.6, 0.7, 0.8, 0.9, 1.0, 1.2, 1.5–2.0–2.5–3.–3.5–4.0–4.5 $\mu$m). The particular size of the voids in a sample of substrate is determined according to a proportional relationship with the excitation wavelength used. The diameter or size of a void or inorganic particle in the networked material increases as wavelength increases. For example, a substrate having a void size of about 0.7 or 0.8 micron to about 1.0 or 1.3 micron would work well with a light wavelength of around 530 nm. The same dimensions for voids can apply to the individual inorganic particles. Preferred particle sizes range from about 0.1 to about 5 or 7 microns, inclusive. As a function of the particle size of the porous inorganic layer, sensitivity on a Cy-3 channel was found to be highest for a particle size of 1 $\mu$m, approximately by a factor of 40 times higher than on comparable flat, nonporous, inorganic slides. Overall, the porous inorganic layer has a thickness of at least about 5 microns, preferably in a range of about 8 microns to about 50 microns (10–40 microns), and more preferably about 14 or 16 microns to about 33 or 35 microns (20–30 microns).

The inorganic material of the porous layer and the contents of the voids, which are formed therein, exhibit a high contrast in their respective indices of refraction relative to each other. Generally, the refractive index of the inorganic material of the porous layer is greater than that of the contents of the voids, whether that content is a gas (e.g., air, purified air, argon, etc.), a liquid (e.g., water, index fluids, solvents, etc.), or a solid (e.g., gel, plastic, etc.) that infiltrates into the voids. In other words, the difference between the indices of refraction between the two substances—porous inorganic material and void content—should be as large as possible. A high contrast between the respective indices of refraction can improve the optical detection of fluorescence, thus increasing the fluorescent signal-to-noise-ratio. By adjusting the microstructures of the porous layer (e.g., layer thickness, pore and particle size), one can optimize the high contrast of indices.

A uniform coating of a binding agent or entity for attaching biological and chemical analytes is applied to cover at least a portion of the surface area of the voids and the top surface of the porous inorganic layer of the substrate. Although the nature of the binding agent is not intended to be limiting, the binding agent can be a cationic polymer, preferably either gamma-aminopropyltriethoxysilane or polylysine. Other suitable chemical agents, as described below, may be used or substituted for attaching biological molecules (e.g., DNA, RNA, oligonucleotides, peptides, proteins, etc.).

In preferred embodiments, the substrate has an interlayer (12, 22, 32, 42) disposed between the porous inorganic layer and the non-porous inorganic understructure. To maintain the planar flatness of the substrate, the interlayer has a coefficient-of-thermal-expansion compatible with the porous inorganic layer and the inorganic understructure. The interlayer bonds the two other layers to one another and promotes better attachment of the porous layer to the impermeable understructure and increasing chemical durability of the porous layer under harsh conditions as used in actual experiments. This feature prevents the porous layer from delaminating from the understructure under research or testing conditions, such as in deionized water and at high temperatures (autoclave), which are corrosive to silicates like a porous glass layer.

In a preferred embodiment, the interlayer and porous layer both are made of glass. The glass used to form the interlayer preferably will have a softening point that is lower than that of the glass used to form the porous layer. Hence, firing at a temperature that only partially sinters the porous layer should yield a dense or nearly fully dense interlayer. The interlayer may be manufactured by green-on-green or green-on-fired methods. It is recommended that tape casting slips of the glasses for both the interlayer and the porous layer should be prepared according to the description given in more detail below. To illustrate, the slip that contains the glass frit for the interlayer could be tape cast into a glass panel with a tape casting blade having a gap height of 0.5 mil (1/1000 inch). The green-on-green body can then be fired at an appropriate temperature and length of time (e.g., 710° C. for 2 hours). As mentioned above, all of the glasses are coefficient-of-thermal-expansion matched to each other so as to minimize distorting or bowing of the substrate. Other kinds of glasses or metal oxides may be substituted as appropriate.

In another aspect, the invention relates to methods for the production of the substrate and porous inorganic layer. Generally, glass, glass-ceramic, ceramic or metal oxide particles are deposited onto a dense, flat, rigid, impermeable, inorganic understructure or backing, (e.g., a glass slide, metal or metal oxide sheet) to form a porous layer for DNA-binding. The understructure may take any form, but according to a preferred embodiment is a material with a high melting temperature, such as calcium aluminosilicate glass (Corning Inc., Code 1737).

In certain preferred iterations, the method of fabrication employs a tape-casting and/or screen-printing process. (See generally, James S. Reed, INTRODUCTION TO THE PRINCIPLES OF CERAMIC PROCESSING, pp. 397–400, John Wiley and Sons, Inc., 1988; and, Peter Mytton-Davies, SCREEN PROCESS PRINTING, Press and Process Publications, United Kingdom, 1952, both of which are herein incorporated by reference.) These methods generate a mechanically and chemically robust porous inorganic layer on the substrate. In a tape-cast porous layer, the size and amount of porosity can be controlled by the solid-loading of the slip, firing temperature and time, and size of the ceramic or glass particles in the slip. Typical values of porosity can range between 0 and about 70 percent, and size of the pores can be varied between 0.1 to 20 $\mu$m. Thickness of the porous inorganic layer is controlled by the gap height of the tape casting blade. The tape casting is an attractive process for manufacture of porous DNA binding layers for several reasons. First, a large scale, continuous, manufacturing process is easily implemented. Second, tape cast porous layers have a uniform thickness and the process as a whole is reproducible. Third, the cost of chemicals used in the manufacture of the slip is low. Fourth, tape casting is capable of producing layers with thickness in the range of about 5 $\mu$m to about 100 $\mu$m in a single step. Other techniques such as sol-gel (e.g., U.S. Pat. No. 5,585,136, incorporated herein by reference), spray-coating, spin-coating, or dip-coating also can be used to produce porous inorganic layers, but these techniques tend to be inferior to tape casting. For example, multiple coating steps with intermediate drying may be necessary for sol-gel and dip coating techniques to produce a layer of sufficient thickness. This type of processing complicates manufacture since the process cannot be executed in continuous manner. Most importantly, uniformity and reproducibility of layers from batch to batch or piece to piece is lower than for tape casting. With screen-printing, one can have better control over the shapes of the applied porous layer, and can also more easily apply customized coatings for individual pre-finished slides.

The present invention is compatible with existing probe-retention and target DNA-hybridization protocols. In potential commercial embodiments, addition of probe DNA to the porous substrate can be followed by treating the substrate with a blocker agent or deactivator (e.g., succinic anhydride, salmon sperm, or anionic polymers- polygutamic acid, polyacrylic acid, heparin, etc.). Blocking of the substrate can reduce non-specific binding of target DNA strands and reduce overall background signal in the peripheral regions round the dots of probe DNA.

EXAMPLES

The following examples describe the fabrication of a porous substrate according to the present invention, and illustrate its use with DNA. It is contemplated, however, that the porous inorganic substrate may also be used as a platform for immobilizing arrays of other biological molecules or "binding-entities" that have a covalent or non-covalent binding affinity specific for another molecule. Preferably, a specific binding entity contains (either by nature or by modification) a functional chemical group (e.g., primary amine, sulfhydryl, aldehyde, carboxylic, acrylic, etc.), a common sequence (nucleic acids, an epitope (anitbodies), a hapten, or a ligand, that allows the binding entity to bond or react covalently or non-covalently with a common function group on the surface of a substrate. Specific binding entities include, but are not limited to: deoxyribonucleic acids (DNA), ribonucleic acids (RNA), synthetic oligonucleoides, antibodies, proteins, peptides, lectins, modified polysaccharides, synthetic composite macromolecules, functionalized nanostructures, synthetic polymers, modified/blocked nucleotides/nucelosides, modified/blocked amino acids, fluorophores, chromophores, ligands, chelates, and haptens.

In the working examples, borosilicate glass was selected as the porous layer since borosilicates are transparent and are readily available, although other glasses having similar physical characteristics may be substituted. The glass transition/sintering temperature of the substrate and porous layer should be similar so as to provide for strong adhesion between the two. Also, in the ideal situation, the surface is positively charged in a neutral aqueous solution, so as to aid in attaching the negatively charged DNA molecules.

Example 1

Fabricating the Porous Substrate

Crushed borosilicate glass particles are sieved and wet-milled to a reduced particle size (average size in the range of about 2.3–3.5 μm). The particles were balled for 24–72 hours using a one gallon bottle (Nalgene) charged with the crushed borosilicate glass, $ZrO_2$ milling cylinders and filled with isopropanol to about 85 percent full. After milling, the slurry was stirred and then allowed to stand without disturbance for the particles to settle. Settling can further control the size distribution of the glass particles before a binder is added. The liquid slurry was poured from the Nalgene bottle and the isopropanol was evaporated on a hot plate to recover the glass powder. Care was taken no to disturb the sediment at the bottom of the bottle. The average particle size of the borosilicate powder obtained after settling was in the range of about 0.5–1.3 μm. The borosilicate powder was used in preparation of slip for tape casting.

U.S. Pat. No. 5,089,455, incorporated herein by reference, describes in detail the preparation of zirconia based slips for the tape casting of thin zirconia electrolytes such as for fuel cell applications. Preparation of the borosilicate slip for casting of a porous layer was performed in analogous fashion according to the procedure given in that patent. The recipe was adjusted to account for the difference in density of $ZrO_2$ and borosilicate, and no settling was performed to narrow the particle size distribution. In brief, 100 g of milled borosilicate powder, 90.9 g ethanol, 21.98 g 1-butanol, 5.0 g propylene glycol, 6.25 g distilled water, 2.5 g Emphos, and 1125 g of one cm $ZrO_2$ milling balls were weighed into a 500 ml nalgene bottle and vibratory milled for 72 hours. The milled slip was poured from the Nalgene bottle without the milling media into a new 250 mL Nalgene bottle. The final step in the preparation of the slip was to add 5.0 g of a 50 w/o mixture of glacial acetic acid and isopropanol, 8.75 g dibutylphthalate, and 15 g polyvinylbutyral, and five or six 1 cm zirconia milling balls. The bottle was then rolled gently at less than 1 rotation per second to thoroughly mix and remove bubbles for at least 72 hours prior to tape casting.

Figure 2:
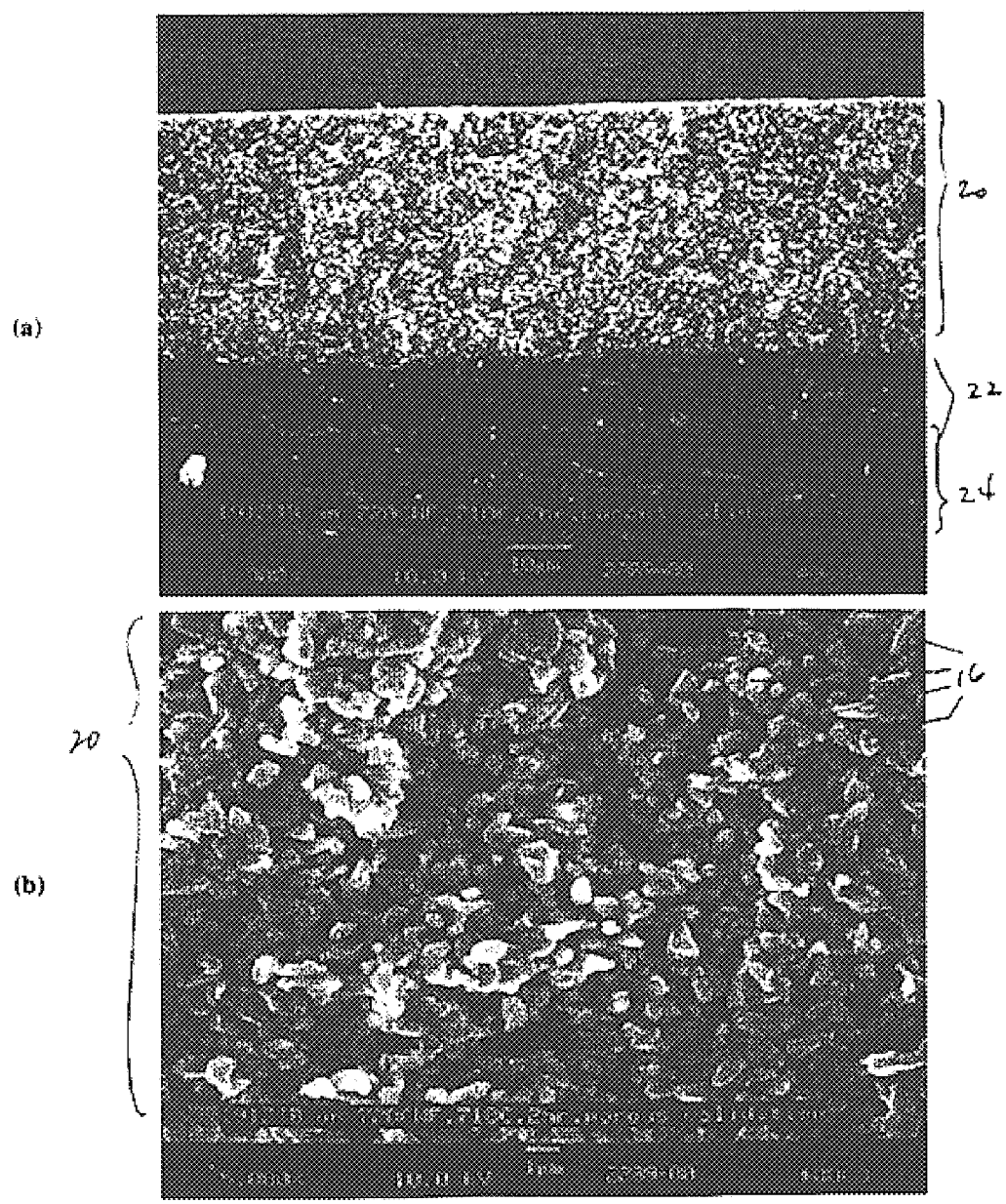
FIGS. 2(a) and (b) are SEM photographs of a two-layer porous HDA substrate in cross-section, fabricated by a tape-casting method and fired at 710° C. for 2 hours, at (a) 1000× and (b) porous glass layer at 5000×.
Figure 3:
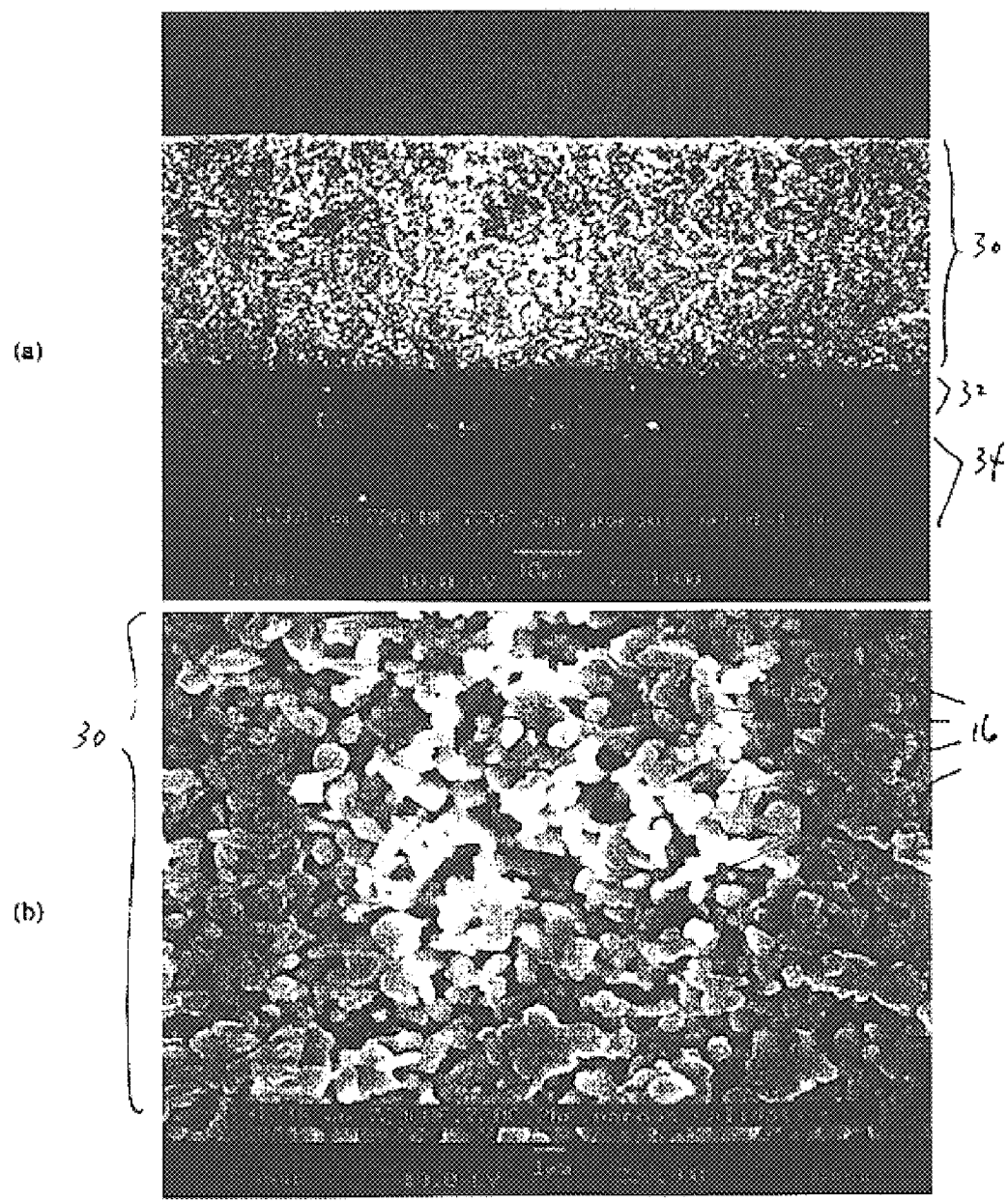
FIGS. 3(a) and (b) are SEM photographs of a two-layer porous HDA substrate in cross-section, fabricated by a tape casting method and fired at 720° C. for 2 hours, at (a) 1000× and (b) porous glass layer at 5000×.
Figure 4:
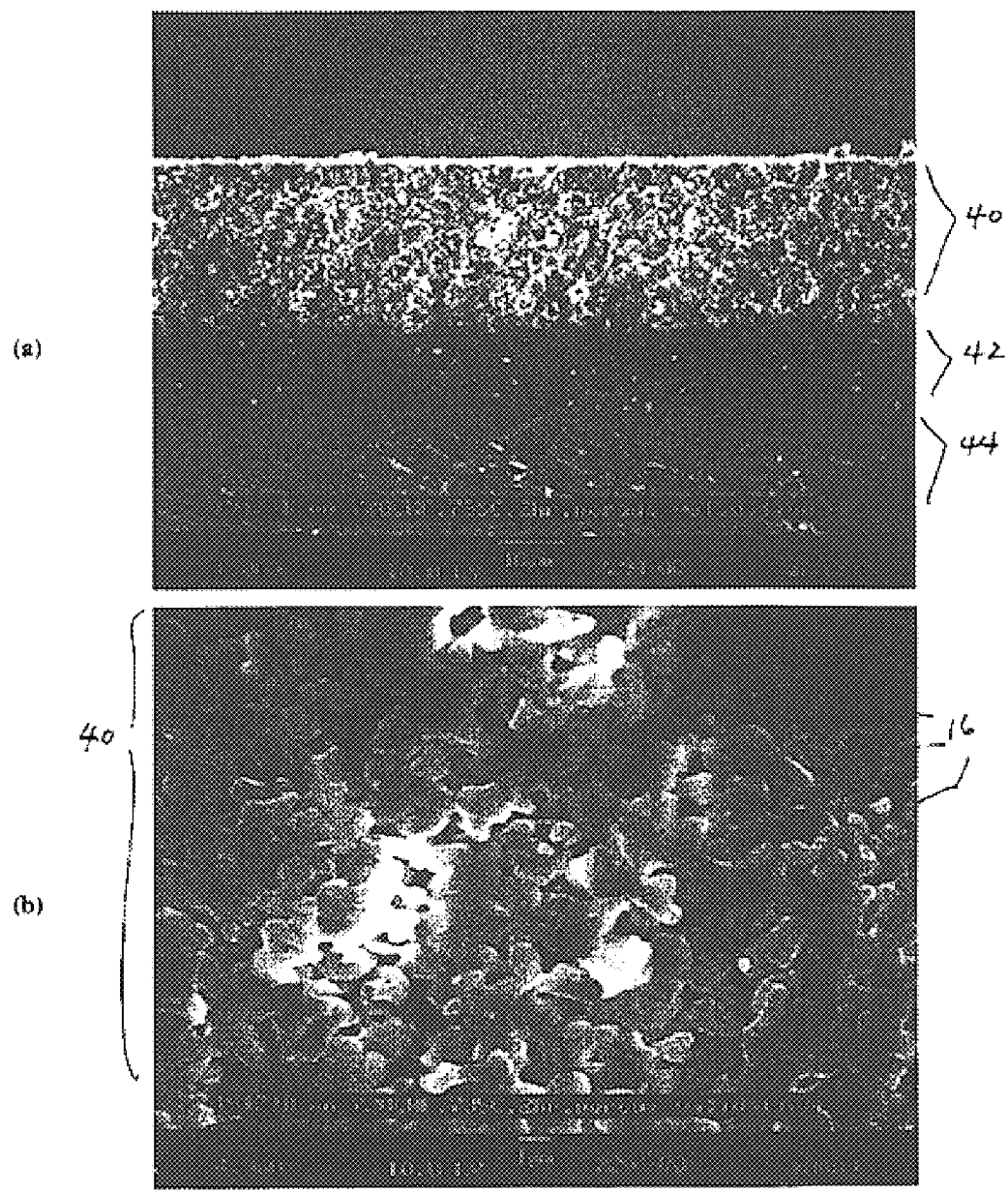
FIGS. 4(a) and (b) are SEM photographs of the two-layer porous HDA substrate in cross-section, fabricated by a tape casting method and fired at 735° C. for 2 hours, at (a) 1000×and (b) porous glass layer at 5000×.

The examples shown in FIGS. 2, 3, and 4, employ a porous layer (20, 30, 40) made from a borosilicate frit (191), a interlayer (22, 32, 42) made from another borosilicate frit (720), and an impermeable understructure (24, 34, 44) made from a calcium aluminosilicate glass (Corning Inc., Code 1737). Table 1 lists the batch compositions, in weight percent, of glass compositions 191 and 720.

TABLE 1

Borosilicate Glass Compositions

| Oxide (Weight %) | Ex. 720 | Ex. 191 |
| --- | --- | --- |
| $SiO_2$ | 67.0% | 70.32% |
| $Al_2O_3$ | 5.50 | 5.12 |
| $B_2O_3$ | 23.2 | 17.17 |
| $Li_2O$ | 0.66 | — |
| $Na_2O$ | 2.25 | — |
| $K_2O$ | — | 1.90 |
| MgO | — | 0.58 |
| CaO | 0.40 | 2.33 |
| SrO | — | 0.58 |
| BaO | — | 1.79 |
| $Sb_2O_3$ | — | 0.20 |
| F | 1.00 | — |

Tape casting of the slips to form the porous substrates for microarrays is straightforward. A panel of 1737 glass scored to give 1 inch by 3 inch microscope slides was cleaned on both major surfaces. Using a tape casting blade the 720-glass bonding layer is applied first. The coating should be allowed to dry before proceeding. The 191-glass slip is cast on top of the 720 glass using another tape casting blade, to give a porous borosilicate layer of approximately 6–12 μm in thickness. A pipette was used to draw 10 ml of the borosilicate slip, and the slip was applied in front of the blade. The blade was pushed across the slides at a rate of ~0.2 feet per second. The coated slides were allowed to dry. It is helpful if the span of the second tape casting blade is slightly longer than the first blade. Otherwise, a small amount (~1 mm) of the 720-glass coating should be trimmed from the edge of the coating with a razor. Trimming is necessary so that the feet of the blade used to apply the 191-glass coating ride on the surface of the 1737 glass panel and not the 720-glass coating. Once the 191-glass coating is dry, the 1737 glass panel can be snapped into individual slides and fired. These tape-cast slides were fired on alumina fiber board using an alumina fiber board cover. The coated slides were fired at various temperatures (700° C., 710° C., 715° C., 720° C., 725° C., 730° C., and 735° C.) for 2 hours, then cooled to ambient temperature for 4 hours. Fired slides are translucent and have a hazy appearance due to light scattering. In general, the porous borosilicate layers are strongly bonded to the calcium aluminosilicate glass substrate (Code 1737), and porosity of the coatings decreases with increasing firing temperature. Firing of borosilicate at temperatures above 725° C. resulted in nearly fully dense layers.

Figure 5:
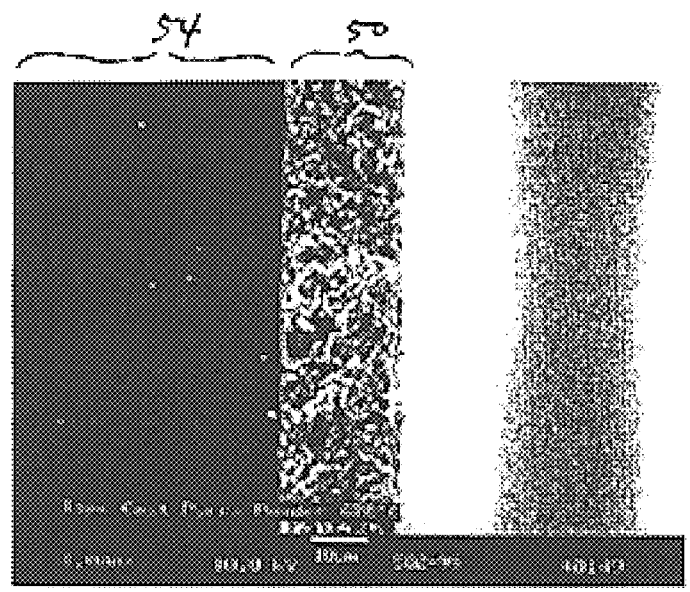
FIGS. 5(a) and (b) are SEM photographs of a porous borosilicate DNA binding layer made by a tape casting method and fired at 670° C. for 2 hours, shown in cross-section and elevation, respectively.
Figure 5:
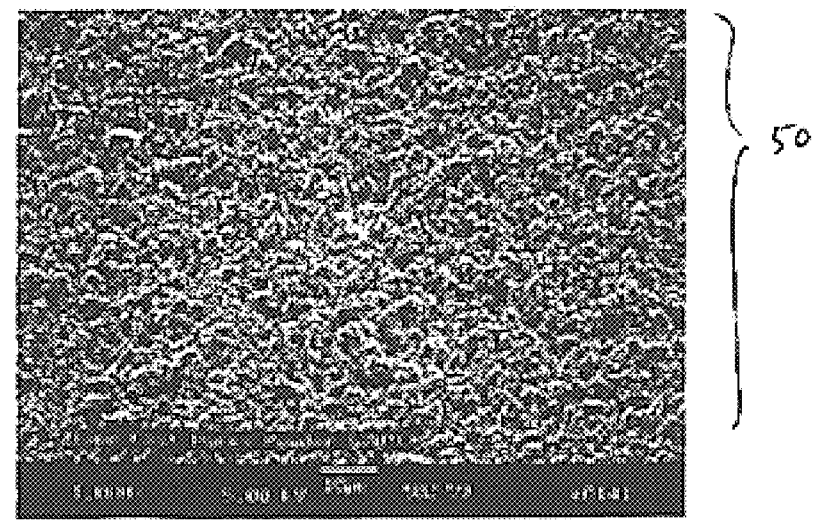
Figure 6:
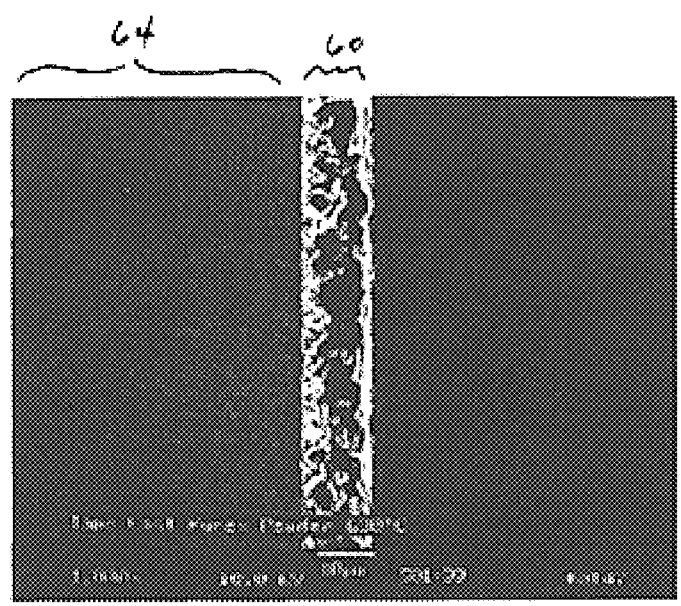
FIGS. 6(a) and (b) are SEM photographs of a porous borosilicate DNA binding layer made by a tape casting method and fired at 680° C. for 2 hours, shown in cross-section and elevation, respectively. The porous layer has partially densified.
Figure 6:
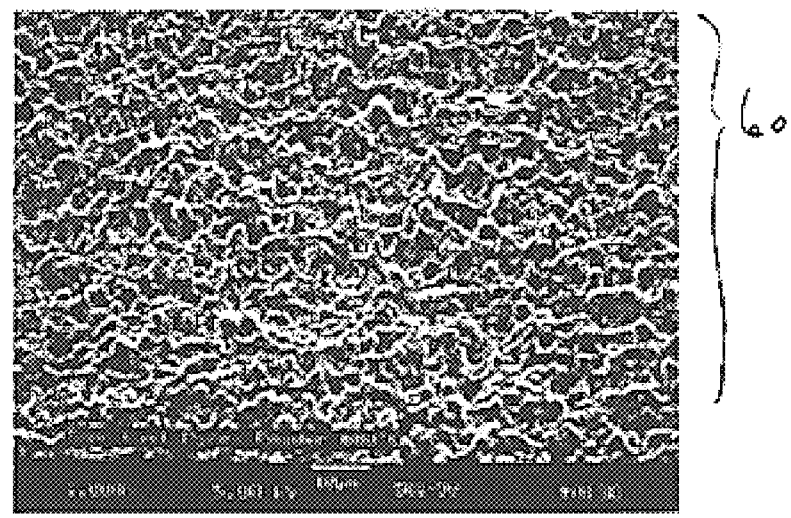
Figure 7:
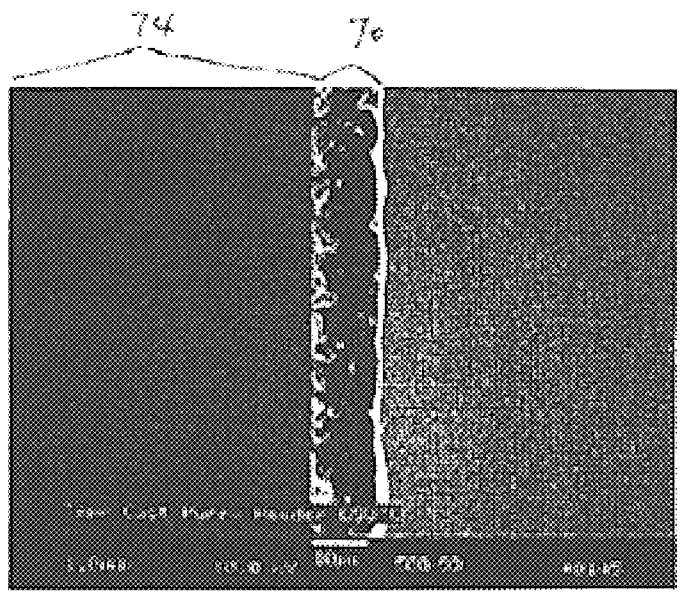
FIGS. 7(a) and (b) are SEM photographs of a porous borosilicate DNA binding layer made by a tape method and fired at 690° C. for 2 hours, shown in cross-section and elevation, respectively. The porous layer has almost densified completely.
Figure 7:
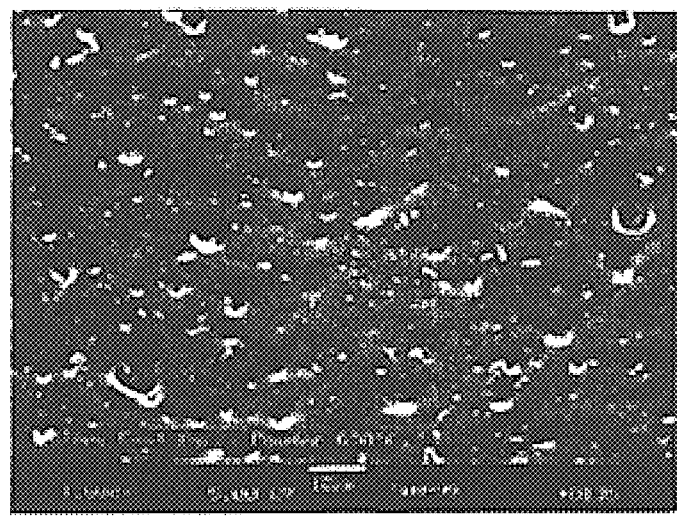

Substrates that use alternative potassium borosilicate glass compositions (e.g., Corning Inc., Code 7761) have lower firing temperatures than the 191- and 720-glass compositions. To achieve desired characteristics for these borosilicate compositions, the optimum firing temperature lies between about 650° C. and 690° C. FIGS. 5a, 6a, and 7a show SEM micrograph images of cross-sections of a tape-cast, porous borosilicate layer 50, 60, 70, on a non-porous underlayer 54, 64, 84, after firing, respectively, at 670° C., 680° C., and 690° C. for 2 hours. Morphology of the porous layer varied considerably as a function of sintering temperature. FIGS. 5b, 6b, and 7b show the microstructure in the porous layer and its relative porosity for each of the examples. Borosilicate particles appeared as isolated independent entities in porous layers fired at 670° C. At 680° C., the particles were joined to one another by well-formed necks, and there appeared to be a bimodal distribution of pore size. Larger pores were ~5 μm, and the smaller pores have an average size of ~0.5 μm. At 690° C., the outer surface of the porous layer is nearly fully dense, but there are isolated channels approximately 1 μm in diameter that connect to a subsurface region of higher porosity. The thickness of the films was measured to be 10–12 μm for firing temperatures of 680° C. and 690° C. and 18–20 μm at 670° C. The number of possible DNA binding sites is higher in a tape cast porous layer as compared to a non-porous glass slide.

Example 2

Substrate sensitivity

Porous microarray slides according to the invention exhibit lower detection thresholds and higher sensitivity as compared to flat nonporous slides printed with the same biological material, hybridized under similar conditions, and scanned on identical scanners. All hybridization experiments described herein employed a 2:1 dilution series. A Cy-5 dilution series was printed in two separate runs on porous microarray substrates to measure sensitivity and detection threshold with non-porous substrates as controls. In the first run, the dilution series was printed onto porous substrates according to the present invention, along with CVD-coated and dip-coated 1737 slides. All slides were scanned after printing to measure fluorescence intensity and analysis. Subgrids that have lower biological concentrations and regularly shaped spots are visible on the porous microarray, but not visible on the non-porous substrates. These observations were quantified. All porous slides had higher sensitivity and better detection threshold than the flat slides. On average, sensitivity of the porous slides was measured to be 65 times higher than the flat controls. Relative detection threshold was on average 53 times better for the porous slides.

In a second run, the dilution series was printed on tape-cast porous substrates fired at 700° C. and 710° C., screen-printed substrates fired at 700° C., 710° C., 720° C., and 730° C., and control samples CVD-coated 1737 slides, dip-coated 1737 slides. On average, the relative sensitivity of the screen-printed porous substrates appeared to be 50 times higher than the non-porous controls, and the detection threshold was 60 times lower. Of the samples examined, the average sensitivity and detection threshold for porous substrates produced by the tape casting method were 146 times higher and 164 times lower, respectively, than the non-porous slides.

Figure 8:
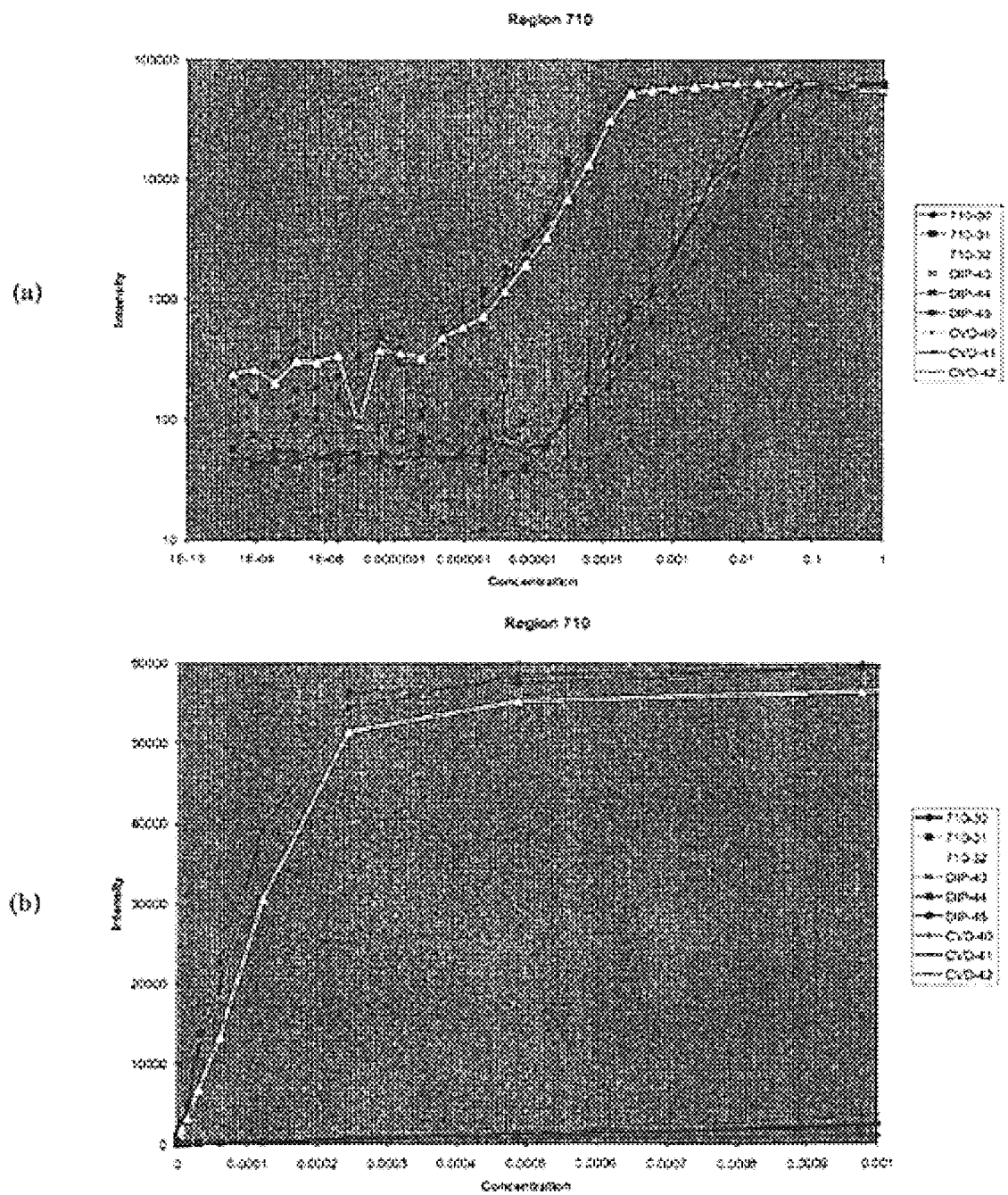
FIGS. 8(a) and (b) are plots comparing fluorescent intensity as a function of Cy-5 concentration for a porous slide as shown in FIG. 2, versus a flat non-porous slide, both of which were either CVD or dip-coated with y-aminopropyltriethoxysilane (GAPS). To emphasize detection threshold.
FIG. 8(b) is on a linear scale.

Substrates fired at 710° C. had the smallest average particle size and highest porosity and gave the highest relative sensitivities and lowest detection thresholds. FIG. 8 is a plot of fluorescent intensity versus concentration for three porous substrates and the non-porous controls on (a) log—log and (b) linear scales. The log—log plot emphasizes lower detection threshold for the porous slides, and the higher sensitivity is shown more clearly in the linear plot. Average relative sensitivity of these slides is 104 times higher than the non-porous controls, and the detection threshold is 128 times lower.

Example 3

Hybridization Sensitivity

Employing a so-called "flip-flop" strategy for hybridization using yeast cDNA, wherein the probes for both Cy-3 and Cy-5 channels comes from the same source material and one type of fluorophore is used at a greater proportion than the other for one set of slides and then flipping the proportions for another set, one can generate a response curve similar to a dilution series. For the examples described herein, the proportions were 10:1. All slides were treated the same, with the exception of the amount of probe used for hybridization. The flat non-porous slides were scanned at photo-multiplier tube (PMT) settings of 800 on both channels of an Axon/GenePix 4000a. The porous slides were scanned at PMT settings of both 500 and 800. The lower scanner setting was needed on porous slides to avoid saturation of the PMT for certain spots.

Figure 9:
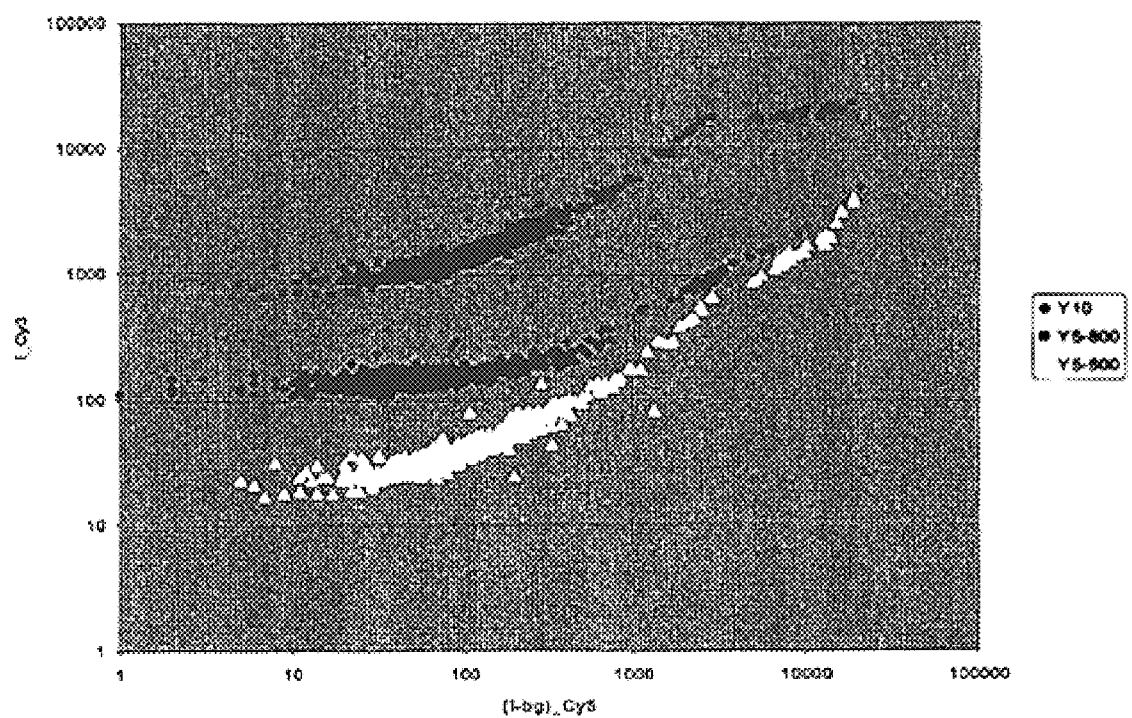
FIG. 9 is a plot of intensity on the Cy-3 channel versus background subtracted intensity on Cy-5 channel for a flat, non-porous (Y10) and a porous slide according to the present invention (Y5). The numbers 500 and 800 in the legend denote the PMT settings.
Figure 10:
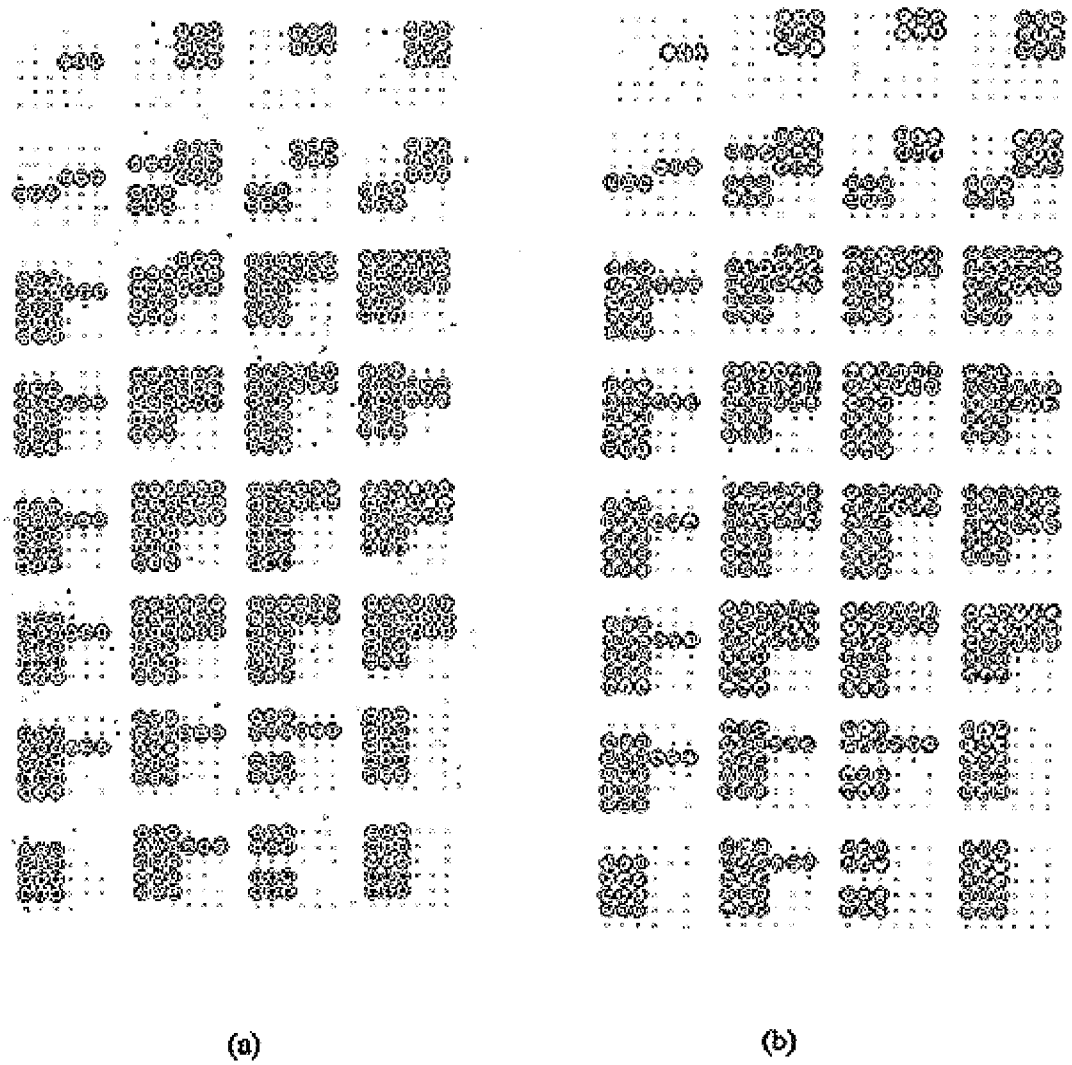
FIGS. 10(a) and (b), respectively, are scanned images of low probe concentration Cy-3 channel of porous slide Y5 and non-porous slide Y10 at a PMT setting of 800.

FIG. 9 is a plot of the response curve generated for a flip-flop hybridization in which Cy-5 is the high concentration component in the probe. The intensity of spots on the Cy-3 channel for the porous slide (Y5) is plotted against the background subtracted intensity of spots on the Cy-5 channel for the porous slide (Y10). The response curve for the flat slide is smooth and shows a clear transition from a linear range at higher concentrations to noise at lower concentrations. Note, that the Cy-3 channel from the porous slide was scanned at PMT settings of 500 and 800. Data from the porous and non-porous slide show the same trend. At high concentrations, (ignoring saturation for the porous slide scanned at a PMT setting of 800) there is a linear relationship with intensity, and intensity eventually falls into noise moving to lower concentrations. More data points lie above the noise level on the porous slide. The point of transition from linearity to noise was determined graphically. The number of points within the linear region was determined to be 454 for the porous slide and 79 on the non-porous slide out of 588 points. The detection threshold of the porous slide is superior to the flat non-porous slide. Vertical displacement of the data for the porous slide relative to the curve for the non-porous slide indicates that the sensitivity of the porous slide is higher. Roughly, the relative sensitivity is 20–30 times higher on the porous slide. Lastly, as evidence of the superiority of the porous microarray substrate, FIGS. 10(a) and (b) show images scanned at a PMT setting of 800 for the low concentration probe channel (Cy-3) for (a) porous slide (Y5) and (b) non-porous control slide (Y10). The spots on the porous slide are higher intensity, more visible, and more of the spots are circular in shape.

In other tests, on porous versus non-porous slides using end-labeled 201-mers, measured the average spot intensity as a function of the concentration of the untagged dCTP in the Cy-5 channel. It was found that the relative sensitivity of the porous slides is approximately four to eleven times greater than on the non-porous slides. Fluorescent intensity on the Cy-3 channel from spots containing the Cy-5 end-labeled oligonucleotides were clearly visible. The fact that the porous surface slides of the present invention could detect a source of fluorescence on the Cy-3 channel in the Cy-5 tagged oligonucleotide demonstrates the relative sensitivity of the porous slides to this contaminant. The sensitivity is approximately ten-fold greater than that of the flat nonporous slides.

Example 4

Signal/Noise Performance

The performance of a porous-layered slide—a calcium aluminosilicate glass underlayer (Code 1737) coated with a porous borosilicate layer, fired at 700° C. for 2 hours—was compared to both a porous Vycor(t slide and to a flat, nonporous glass slide. The DNA printing and hybridization procedure used was identical for all three kinds of slides with the exception of type of GAPS coating. The flat slide was coated using a CVD method, and the Vycor® and tape-cast, porous borosilicate slides were dip coated. Table 2 summarizes the results. Although, the Vycor® glass slide exhibited the highest signal-to-noise ratio for printed DNA, its signal-to-noise ratio for the hybridized strand is lower than the other two types of slides by a factor of six. The signal-to-noise ratio obtained for the printed DNA on the porous borosilicate slide was the highest signal-to-noise ratio for hybridized DNA. The second two columns in Table 2 provide a comparison of absolute signal made by normalizing with respect to the nonporous slide.

TABLE 2

Comparison of signal-to-noise ratio (SN), and normalized absolute signal of printed and hybridized DNA on a tape-cast, porous borosilicate layer, Vycor ®, and nonporous glass slides.

| Slide Type | Printed SN | Hybridized SN | Printed S/Sflat | Hybridized S/Sflat | Shybridized/Sprinted |
|---|---|---|---|---|---|
| Tape-cast | 1365 | 290 | 8.9 | 2.65 | 1.12 |
| Vycor ® | 1400 | 32 | 5.4 | 0.2 | 0.13 |
| Non-porous | 1100 | 200 | 1.0 | 1.0 | 3.8 |

The porous borosilicate slide of the present invention emitted the greatest absolute signal from both printed and hybridized DNA. Absolute signal from printed DNA on Vycor® is also quite high, but the absolute signal from hybridized DNA is a factor of 5 lower than for the nonporous slide. It is believed that on Vycor®, DNA molecules pile on top of one another with the result that the most of the DNA is not accessible for hybridization. Thus, the tape-cast porous slide is superior to Vycor® and flat glass slides in terms of absolute signal in general, and it can be concluded that porous borosilicate retains the greatest quantity of DNA overall. A comparison of the ratio of absolute signals of printed and hybridized DNA showed that in absolute terms, the porous borosilicate retained the most printed DNA and held more hybridized DNA strands. Thus, the porous slide has higher hybridization efficiency. An increase in porosity may improve the access of hybridized DNA to the printed DNA in tape-cast, porous slides.

Figure 11:
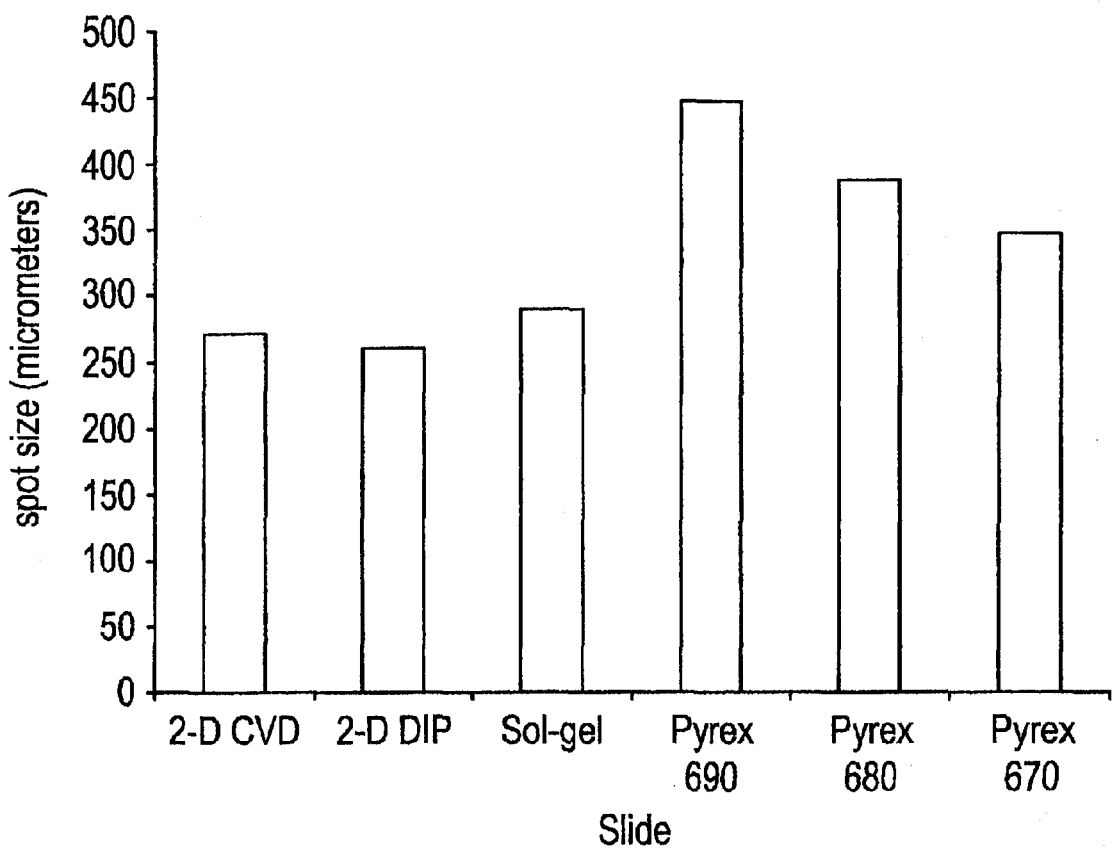
FIG. 11 is a graphical representation comparing the spot size of robotically printed DNA on various types of surfaces using a solid printing pin with a 200 $\mu$m diameter.

Tape-cast porous borosilicate slides were also compared with non-porous and sol-gel coated slides. A number of spots were printed on each slide, and each dot was analyzed individually to ensure that observations were supported statistically. FIG. 11 shows that spot size was observed to be a function of surface type. Spot sizes of the two flat slides were about 260 µm in diameter, somewhat larger than the print pins (200 µm). Spot size on the sol-gel coated slide was about 290 µm. The largest spot sizes were obtained for DNA printed on tape cast porous borosilicate, and spot size was observed to increase with sintering temperature. If the volume of DNA solution printed is constant, spot size intuitively increases with sintering temperature since less porosity is available per unit volume. Spot size can be controlled by adjusting the thickness of the porous borosilicate layer, a thicker layer should result in a smaller spot size.

Figure 12:
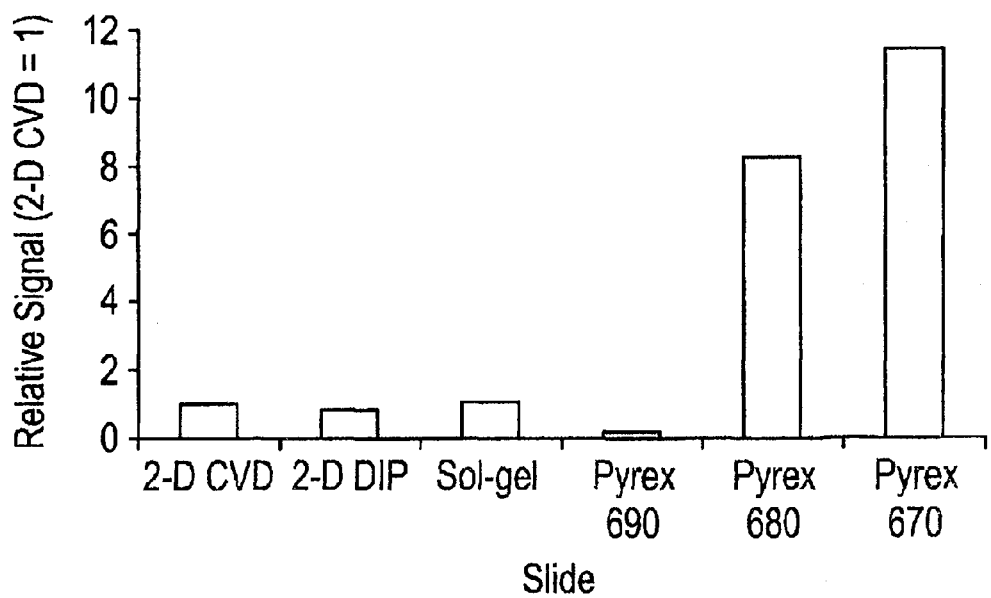
FIG. 12 is a graphical representation comparing the relative signal of labeled DNA immediately after printing on various types of surfaces.
Figure 13:
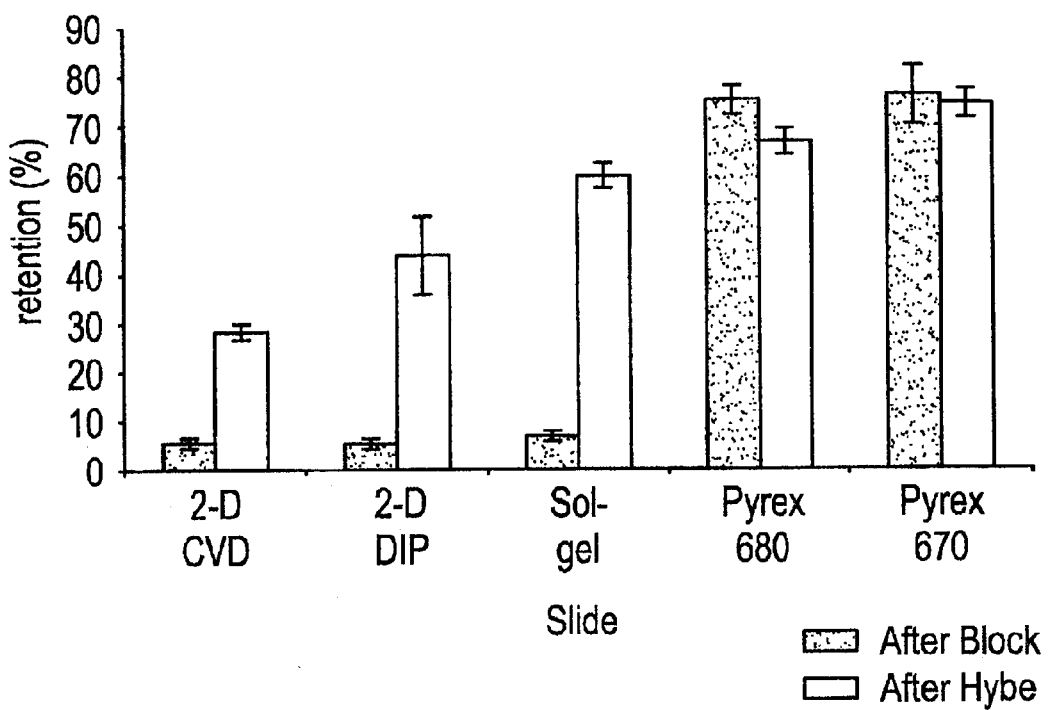
FIG. 13 is a graphical representation comparing the percentage retention of printed DNA on various types of surfaces after blocking and hybridizing.

FIG. 12 shows a plot of the relative fluorescent signal measured immediately after printing normalized to the CVD GAPS-coated non-porous slide. Average signal for each spot was calculated within 450 µm diameter circle. Porous borosilicate fired at temperatures of 670° C. or 680° C. gave higher signal by nearly an order of magnitude compared with sol-gel and flat glass slides. The high signal intensities for porous borosilicate may be due to a number of factors. One of which may be the force of capillary action adsorbing greater amounts of DNA solution from the printing pin into the porous layer. Retention of printed DNA after blocking and hybridizing was assessed by taking the ratio of the average fluorescent signal intensity within a 220 µm diameter circle inside each spot to the same spot immediately after printing. FIG. 13 shows a plot of percent retention of DNA solution for each slide with exception of the porous borosilicate slide fired at 690° C. Error bars in the plot are the spot-to-spot standard deviation. Porous borosilicate fired at 670° C. was found to retain the greatest quantity of printed DNA after blocking and hybridizing.

Figure 14:
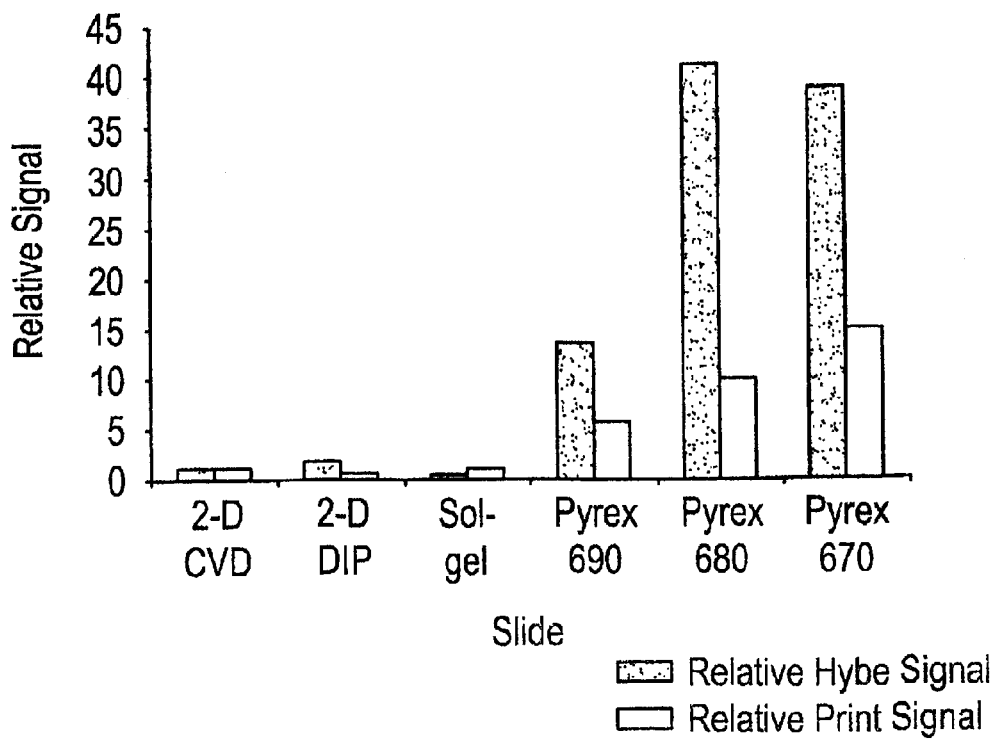
FIG. 14 is a graphical representation comparing the relative signal intensity of printed and hybridized DNA on various types of surfaces as normalized to a non-porous glass slide that is CVD-coated with γ-aminopropyltriethoxysilane (GAPS).
Figure 15:
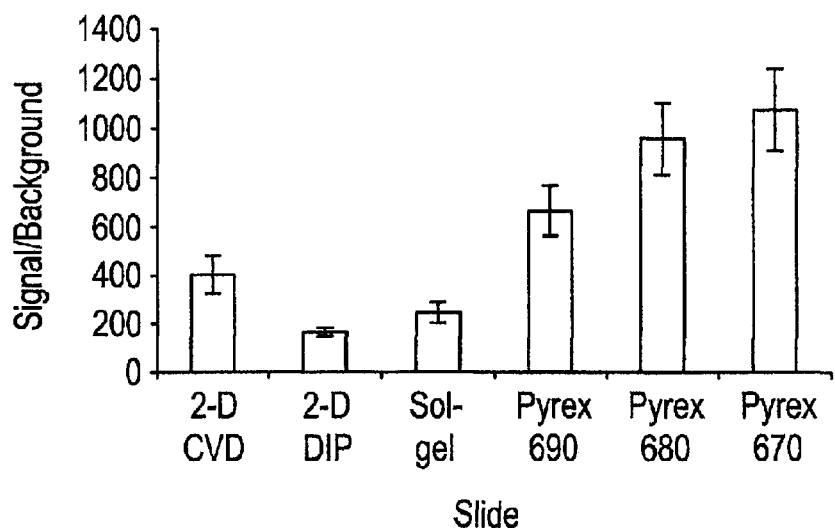
FIG. 15 is a graphical representation comparing the relative hybridization efficiency of printed and hybridized DNA on various types of surfaces as normalized to a non-porous glass slide that is CVD-coated with y-aminopropyltriethoxysilane (GAPS).

Hybridization efficiency after completion of all processing was determined by taking the ratio of fluorescent signal from the hybridized DNA (Cy5 tagged) to the printed DNA (Cy3 tagged). FIG. 14 is a plot of the relative signal, and FIG. 15 is a plot of the normalized hybridization efficiency. Data in both figures were normalized with respect to the flat CVD GAPS coated slide. Fluorescent signal from printed and hybridized DNA was highest for porous borosilicate fired at 670° C. by a significant margin over non-porous or sol-gel coated slides. Hybridization efficiency was highest for porous borosilicate fired at 680° C. In general, these results agree with evaluations comparing porous borosilicate to Vycor® slides as described above. Sol-gel coated and Vycor® slides have very small pore size which retain printed DNA, but the printed DNA is not readily accessible for hybridization.

Figure 16:
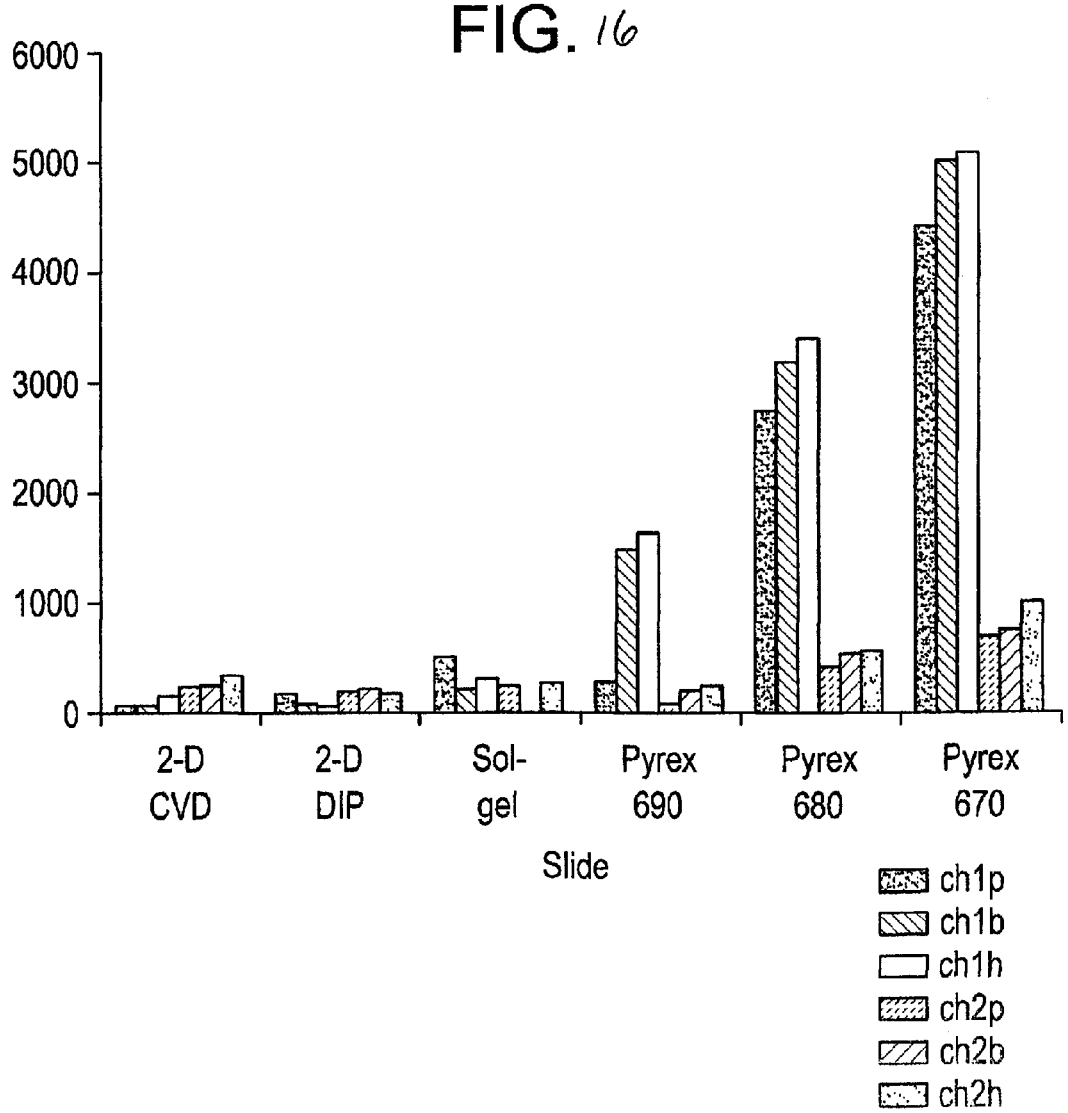
FIG. 16 is a graphical representation comparing the average background fluorescence at wavelengths of the Cy3 marker on channel 1 (ch1) and Cy5 marker on channel 2 (ch2) markers after printing (p), blocking (b), and hybridization (h).

Background signals for the slides were compared after printing, blocking, and hybridizing steps at fluorescent wavelengths corresponding to the Cy5 and Cy3 markers. The results for each type of slide are summarized in FIG. 16, which is a plot of the signal-to-noise (signal-to-background) ratio for the slides with error bars used to indicate the spot-to-spot standard deviation. As expected, background intensity is highest for porous borosilicate and increased with decreasing sintering temperature and increasing porosity. Despite the higher background, the signal-to-noise-ratio for the porous borosilicate is superior to flat glass or sol-gel coated slides.

The present invention has been described by way of examples, those skilled in the art will understood that the invention is not limited to the embodiments specifically disclosed, and that various modifications and variations can be made without departing from the spirit and scope of the invention. Therefore, unless changes otherwise depart from the scope of the invention as defined by the following claims, they should be construed as included herein.

We claim:

1. A method of forming a substrate for attaching an array of biological or chemical analytes, said method comprises:
   a) providing a flat, rigid, non-porous, impermeable, inorganic understructure;
   b) applying a porous, predominantly inorganic layer to a top surface of said inorganic understructure; wherein said porous inorganic layer is formed by an process that comprises:
      1) applying a frit layer of individual particles of an inorganic material to a top surface of said inorganic understructure, said particles having a predetermined mean size of not less than 0.1 µm;
      2) forming a network of inorganic material from said individual particles to create a plurality of interconnected voids of a predetermined mean size of not less than 0.1 µm dispersed through-out said porous inorganic layer, and having void channels that extend through to a top surface of said porous inorganic layer;
   c) configuring said inorganic material and contents of said voids to exhibit a high contrast in their indices of refraction relative to each other such as to scatter light;

d) preparing said top surface of said porous inorganic layer for binding biological or chemical analytes.

2. The method according to claim 1, further comprising applying an interlayer disposed between said inorganic understructure and said porous inorganic layer, and said interlayer having a coefficient-of-thermal-expansion compatible with said inorganic understructure and with said porous inorganic layer.

3. The method according to claim 1, wherein said preparing step comprises applying a uniform coating of a binding agent over at least a part of a surface area of said voids and said top surface of said porous inorganic layer.

4. The method according to claim 3, wherein said binding agent is a cationic polymer.

5. The method according to claim 3, wherein said cationic polymer is either gamma-aminopropyltriethoxysilane or polylysine.

6. The method according to claim 1, wherein said inorganic material is characterized as a material that is non-absorbing and transparent to light when in the form of a solid of an amorphous or single crystal material.

7. The method according to claim 6, wherein said material is a glass, or a metal oxide.

8. The method according to claim 7, wherein said material is a silicate, aluminosilicate, boroaluminosilicate or borosilicate glass.

9. The method according to claim 7, wherein said material is $TiO_2$, $SiO_2$, $Al_2O_3$, $Cr_2O_3$, CuO, ZnO, or $ZrO_2$.

10. The method according to claim 1, wherein said porous inorganic layer has a thickness of at least 5 $\mu$m.

11. The method according to claim 1, wherein said inorganic material particles having a predetermined mean size in the range of about 0.3 $\mu$m to about 5 $\mu$m.

12. The method according to claim 1, further comprises after step b) and before step c) firing said porous inorganic layer at a temperature to adhere said individual particles into said network of inorganic material.

13. The method according to claim 1, wherein said voids have a predetermined mean size in the range of about 0.3 $\mu$m to about 5 $\mu$m.

14. The method according to claim 1, wherein said voids have a predetermined mean size in the range of about 0.5 $\mu$m to about 3.5 $\mu$m.

15. The method according to claim 1, wherein said content of said voids consists of either a gas, a liquid, or a solid.

16. The method according to claim 1, wherein said porous inorganic layer is characterized as having a microstructure that produces a sensitivity of fluorescent molecules of at least one order of magnitude greater than that of a comparable, non-porous substrate.

17. The method according to claim 1, wherein said substrate is fabricated using a tape casting process.

18. The method according to claim 1, wherein said substrate is fabricated using a screen printing process.

19. The method according to claim 1, wherein said porous inorganic layer has a coefficient of thermal expansion compatible with that of said inorganic understructure.

20. The method according to claim 1, wherein said inorganic material forms a continuous networked matrix.

21. The method according to claim 12, wherein said porous inorganic layer is fired at a temperature of about 650° C. to about 735° C.

22. The method according to claim 21, wherein said porous inorganic layer is fired at a temperature of about 650° C. to about 720° C.

* * * * *